United States Patent [19]

Blausten

[11] 4,443,875
[45] Apr. 17, 1984

[54] APPARATUS AND METHODS OF CALL CLEARING IN A PACKET SWITCHED DATA COMMUNICATIONS NETWORK

[75] Inventor: Edmond J. Blausten, Union City, N.J.

[73] Assignee: International Telephone and Telegraph Corporation, New York, N.Y.

[21] Appl. No.: 350,505

[22] Filed: Feb. 19, 1982

[51] Int. Cl.³ .............................................. H04J 15/00
[52] U.S. Cl. ......................................... 370/60; 370/94
[58] Field of Search ............... 370/60, 94, 58; 455/58; 179/18 FA

[56] References Cited

U.S. PATENT DOCUMENTS

| | | | |
|---|---|---|---|
| 3,796,835 | 3/1974 | Closs et al. ............................. | 370/60 |
| 4,058,838 | 11/1977 | Crager et al. ......................... | 358/257 |
| 4,224,478 | 9/1980 | Fahey et al. .......................... | 179/18 FA |

Primary Examiner—Douglas W. Olms
Assistant Examiner—Frank M. Scotch, III
Attorney, Agent, or Firm—John T. O'Halloran

[57] ABSTRACT

There is disclosed a method and apparatus for providing call clearance in a packet-switched data communications system. The apparatus disclosed detects the request of an originating terminal to end a call and delays the request for a predetermined calculated time period. The period is determined according to the length of the message being transmitted, the number and type of transmission links being traversed and the speed of transmission of the sending and receiving terminals. At the termination of this period the apparatus issues a normal clear request which then disconnects the connection while assuring that any data which may have been delayed reaches the destination terminal.

14 Claims, 3 Drawing Figures

APPARATUS AND METHODS OF CALL CLEARING IN A PACKET SWITCHED DATA COMMUNICATIONS NETWORK

BACKGROUND OF INVENTION

This invention relates to packet switching networks, and more particularly to methods and apparatus for call clearing in a packet switching network.

In the early 1970's, packet switching systems were first being investigated as an option for meeting the data communication needs of the future. Today packet switching networks are widely employed in the United States and elsewhere. Essentially, in a packet switching system a customer's or a subscriber's data traffic reaches a packet switching carrier's network interface point over a local access line or a link. At the interface the data is broken down into packets by the PAD (Packet Assembly and disassembly Apparatus). A packet can contain from 1 to 1024 characters depending upon the system and/or the customer's application. The packet is a group of binary digits including a data and control elements which is switched as a composite whole. The data and control elements within the packet are arranged in a specific format. In the packet switching network packets created at the network interface point from many different and diversified customers and terminals are merged into high speed data streams and the data streams are placed under control of the packet switching exchange at the interface point on to the network of private lines where each line is connected to other packet switching exchange central offices.

Depending upon the address of the destination as determined by the packet header, a packet will be routed to or through one or more network switching nodes and/or networks until it arrives at the remote destination. The remote network interface then required by the remote subscriber can reassemble the packets and transmit the data to the proper subscriber via another local loop or line.

In such a system the merging of multiple packet streams means lower capital investment and a high utilization of the data lines and switching equipment. In this manner a carrier can transmit more data with lower operating cost and with a lower initial investment.

In the present packet switching networks due to internationally standardized packet protocols an end-to-end acknowledgement does not exist. In such systems data is only acknowledged on a link-by-link basis. This is due to the fact that the essence of packet switching technology is store and forward. An example of a packet switched communication system which operates in a store and forward mode and which system represents substantial advancements in packet switching is given by reference to U.S. Pat. No. 4,058,672 entitled PACKET SWITCHED DATA COMMUNICATION SYSTEM issued on Nov. 15, 1977 to W. C. Crager, et al. and assigned to the assignee herein.

In packet switched systems as presently employed each link in a connection only engages the previous link. This operation provides a high throughput and substantial error correction. However, this technology does not allow for network congestion and/or delay situations. In the packet switching system as each packet or frame of data is sent down a link it is assigned a number. This number is used for flow control and to assure link by link acknowledgement of each frame. When a node point gets full or congested it stops accepting additional data from the previous node. It does this by advising the node that it is in a Receive Not Ready (RNR) state and that all data should be held up until the node is back in the Receive Ready (RR) state. In addition to this method of RNR and RR, there exists the use of what is called window size parameters. The window size indicates the range of data packets that may be sent by one node to another node without acknowledgment from the recipient. Once all possible numbers within the window have been sent (without acknowledgement being received) the window is considered closed, and the transmitting node stops sending additional data. This state when the window is closed or when a node is in the RNR state wherein the network cannot accept further data from the subscriber customer is referred to as network congestion.

When a customer wishes to terminate the call a clear request (CQ) is sent to the packet network. This is sent by the PAD of the network interface point. In order to signal the PAD that the customer wishes to end the call, an End Of Call (EOC) is transmitted to the PAD by the customer Non-Packet Terminal (NPT). The PAD treats the EOC as a command for issuance of a CQ packet on the packet side of the PAD. The CQ is an unnumbered command, and accordingly even if the window is closed, the CQ will be sent out. Any data in buffers present in the PAD at the time of the CQ packet are released or discarded. As the CQ packet traverses the links between the virtual circuit end points, each link (one by one) is cleared and any data present is also discarded. In this manner, resources are released on a link by link basis and available for other calls to and from other nodes.

In the prior art systems as above described, when a customer wishes to terminate a call he either hangs up his telephone receiver by going on hook or he issues an EOC which is end of call. The packet switching side of the PAD then transmits the CQ packet instantly. In this regard any data that may be buffered on the packet outgoing side as well as intermediary nodes will be instantly discarded as will all buffered incoming data. Additionally, no further traffic is passed by the PAD in either direction associated with that call. In this regard a level 4 or user end-to-end understanding of the EOC/CQ request is necessary for message assurance. As one can ascertain for calls that operate in a true interactive environment this does not present a problem. In the interactive environment both subscribers as the called and the calling subscribers are in direct communication with each other as for example, holding a conversation and therefore when the call is terminated both subscribers normally understand that this is to occur. In any event for operations that employ a non-interactive system, at one or both ends, this presents a substantial problem. It is quite conceivable that after the local end device finished transmitting a message, part of that message has not reached the other side of the call. This is especially true in the non-interactive case as computers interface at much higher speeds that terminals, so data Buffering is employed to balance the speeds. For example, in a data packet switching system a computer or other data terminal may initiate a call to transmit data via the network to a remote computer or subscriber terminal. When the computer has finished transmitting its data it will initiate an EOC. If when the local device issues the EOC, all data has not reached the remote side, the data will be discarded without the knowledge of the local device. In the present system an EOC is entirely equivalent to an instant call end. The above described problem exists in present packet switching systems and based on traffic considerations as described above results in a substantial loss of data during non-interactive connections.

It is therefore an object of the present invention to provide an improved technique for call clearing in a packet switching network.

It is a further object of this invention to provide apparatus which enables the system to wait a predetermined period of time to allow previously transmitted data to reach the desired destination before a call will be terminated.

DESCRIPTION OF THE PREFERRED EMBODIMENT

Call Clearing apparatus is provided for packet-switched data communications network. In such a network data from a plurality of originating terminals is packetized and transmitted in packet form on high speed lines. The packet data streams are then disassembled at a remote location and transmitted to appropriate called or destination terminals. In order to prevent the loss of data during a non-interactive connection, the system recognizes a request for the termination of a connection from an originating line and delays the process of the request for a specified variable time period. After the period elapses the apparatus then issues a clear request packet (CQ) which serves to terminate the connection. In prior art system the processing of the request to clear also terminates the connection and simultaneously discards all data associated with the connection or call. In this system due to said delay one is assured that delayed data as stored or otherwise buffered will arrive at the called or destination terminal prior to the issuance of the clear request packet (CQ) due to said delay.

DETAILED DESCRIPTION OF THE INVENTION

Figure 1:
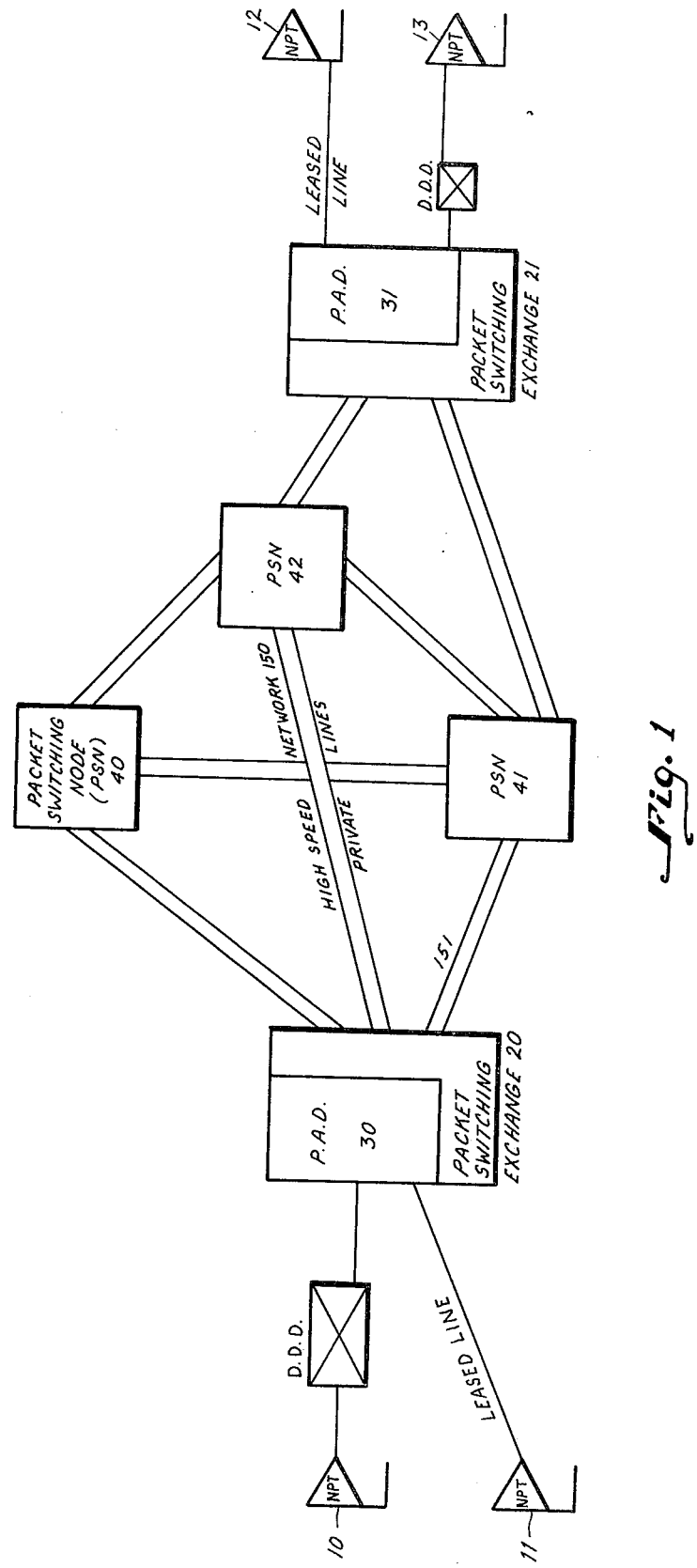
FIG. 1 is a simple block diagram of a packet switching system.

Referring to FIG. 1, there is shown a communications network employing a packet switching system. As indicated, examples of packet switching networks are well-known and such networks are in operation in this country and elsewhere. A packet switching network has a plurality of subscribers each of which is associated with a terminal as 10 and 11. The terminals 10 and 11 are indicated by the letters NPT to designate that these terminals are non-packet terminals. The terminals as 10 and 11 are coupled via conventional telephone DDD leased channel lines to a Network Interface Node 20. The Network Interface Node contains the PAD 30. The PAD 30 is a packet assembly and disassembly apparatus. Each data terminal as 10 and 11 may transmit data to the PAD 30. In the PAD 30 the data string (messages) from a terminal location are broken down into segments or packets which packets may be transmitted at the output side of the PAD 30 through the packet switching exchange in node 20 to a destination terminal such as 12 and 13 via a packet switching network which may consist of various switching nodes as 40 to 42. The switching nodes differ from the Network Interface node in that the switching nodes do not contain a PAD apparatus. The nodes 41 and 42 are connected to a Network Interface Node 21 that supports a PAD unit 32 which is operative to reassemble the data packets into the originally transmitted message and hence transmit to subscribers 12 and 13 they are capable of receiving original serial data string.

In a packet switching system the terminals as 10 & 11 and 12 & 13 may comprise low speed analog terminals, high speed digital terminals, low speed teletype terminals, Touch Tone Coupled Data processing equipment, CRTs, patch terminals, key-board terminals, computers or other word processing systems. Any speed from 50 Baud through 56 Kbs or numerous protocols can be supported.

Essentially as described above, a non-packet terminal (NPT) may be capable of carrying on an interactive conversation or a non-interactive conversation. As indicated for the non-interactive terminal there is a substantial problem in that when the terminal indicates an end of call (EOC) all data which may be delayed or stored in intermediary nodes will be discarded. Essentially, the PAD 30 is a microprosser based communications systems which automatically services the NPT terminals connected thereto. The PAD receives data from each terminal as 10 and 11 and quantizes the data to packet form. In order to do so, the PAD 30 will provide each data packet with an appropriate header to enable the network to direct the data packets to the proper destination. The output side of the PAD 30 which is also referred to as the packet side 13 passes the packet to the packet switching exchange in the interface node 20. The packet switching exchange then takes the packet data and transmits the same over high speed data lines such as 150 and 151. Hence, the individual data from each terminal as 10 and 11 is converted into packets which are then serially emplaced in a single data stream for transmission over a high speed line or trunk as 150 and 151.

Included in a packet switching system is a switching network or switching nodes as 40 to 42. The function of these nodes is to respond to the destination of each packet and to switch the packet data to a destination network interface node 21 where the appropriate packets are reassembled and transmitted by the PAD 31 via local lines to the destination terminals as NPT 12 and 13.

The system shown in FIG. 1 is extremely general in nature and is a simple representation of a packet switched communication system. In the system shown in FIG. 1 when a customer wishes to terminate a call, he hangs up or issues an end of call (EOC). The EOC is received by the PAD 30. The PAD 30 recognizes the EOC generated by a subscriber and issues a clear request (CQ) packet on the packet side of the PAD to the packet switching exchange. The CQ packet as is known is an unnumbered command and is transmitted immediately. As the CQ traverses the links through the network data in storage buffers as data associated with the call for which the end of call was issued, is discarded. Essentially, the basic EOC by the customer (NPT) causes the packet switching side of the PAD 30 to issue the CQ packet instantly.

Thus as indicated in a non-interactive system it is quite likely that after the local device as NPT 10 finishes transmission, part of the original message will not reach the destination terminal. If the local device issues an EOC, then all data that has not reached the remote side will be discarded.

Figure 2:
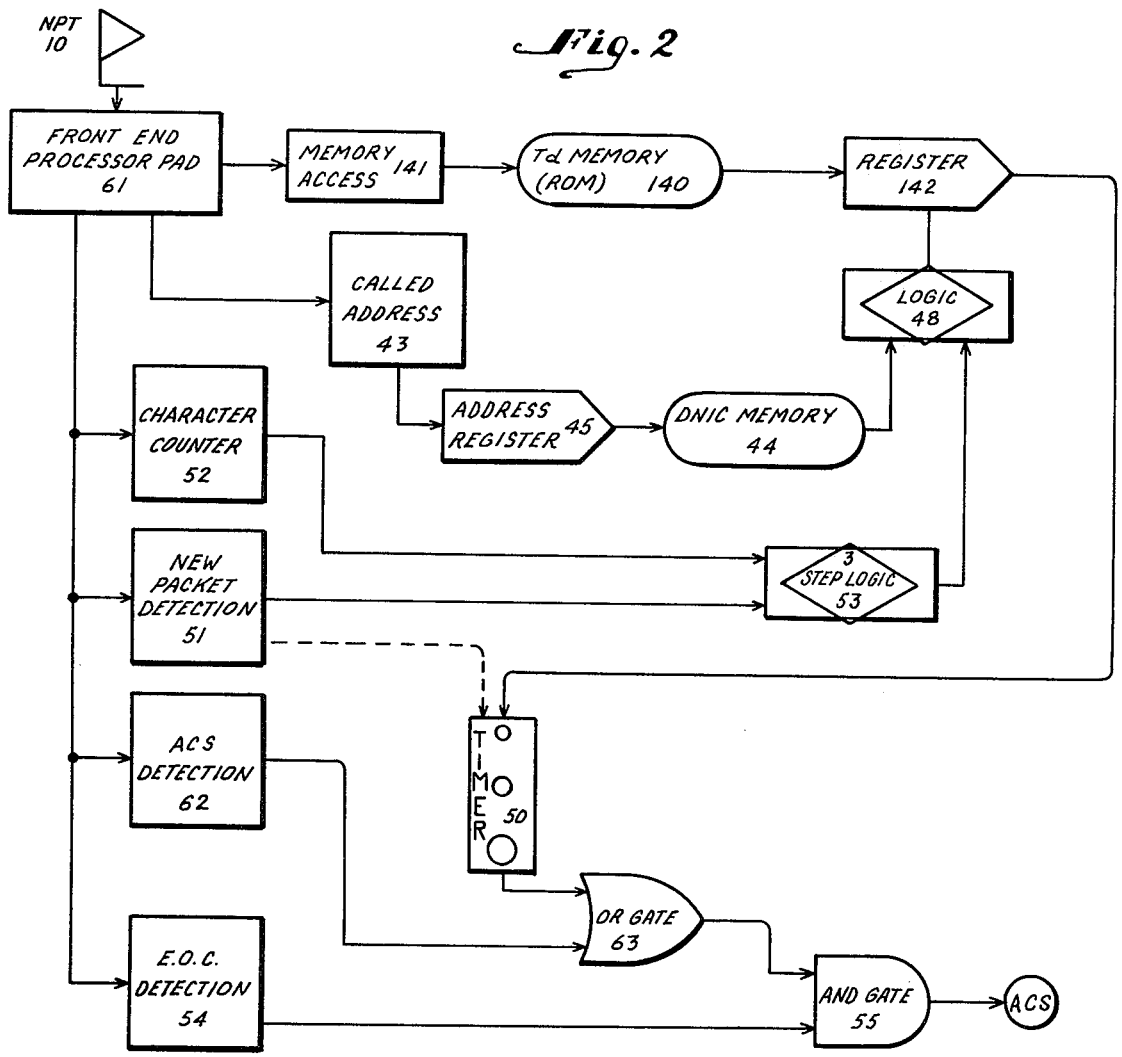
FIG. 2 is a simple block diagram of a call clearance apparatus according to this invention.

Referring to FIG. 2, there is shown apparatus for generating an advanced end of call signal. For purposes of the present explantation this new signal which is indicative of an end of call signal according to this invention will be referred to as an auto clear signal (ACS).

In employing the ACS technique the system is caused to wait a predetermined period of time for data delivery. This period will allow previously transmitted data to reach the required destination. The system uses the predetermined time period to control the release of the CQ. In order to assure sufficient time for data delivery while keeping system sources to a minimum thereby maintaining high speed transmission capability, the value of the predetermined time period is made dependent upon various system parameters. In particular, the value of the predetermined delay time (Td) is variable and is dependent upon:
1. The length of the message being transmitted.
2. The number and type of transmission links being traversed in the virtual circuit.
3. The speed of the sending and receiving terminals.

In regard to the above noted parameters it is understood that depending upon the message being transmitted, the length of the message could substantially vary. For example, a NPT terminal such as 10 may be a low speed remote job entry terminal. In this manner it may take over three minutes to input an entire job. The message which may consist of 100's of packet cards of information is normally held or stored for forwarding to a remote destination. Based on this length the particular value of Td for such a subscriber is different than the value for a credit card authorization terminal that sends only short terminal bursts. The packet switching system may also include digital transmission channels which are provided at 96K-bps, while low band or 4 kHz analog channels may also be provided. Thus the transmission time is also a function of the type of transmission links which are being employed in the virtual circuit.

As above indicated, the speed of the sending and receiving terminals also has to be considered in computing the value of Td. This is due to speed conversion apparatus that provides buffering of data destined to node low speed terminals to high speed terminals. The system will automatically use Td to control the release of the CQ. For example, in one embodiment a timer will start when the first data packet is sent out and is reset each time a subsequent packet is sent. At the end of the time when the system PAD receives the ACS, it is treated as a request for a CQ. The value of Td is made to be variable and is determined during the actual transmission of the message. Threshold levels or steps are setup at which the value of Td is changed. In FIG. 2, there is shown a technique wherein circuitry included in the PAD 30 is employed to handle the Td value calculation.

The NPT such as 10 and 11 are coupled to the PAD 30 via a front end processor 61. The front end processor basically monitors each NPT terminal to determine whether or not a service request is indicated. The front end processor 61 will then acknowledge the service request by sending a suitable signal to the terminal 10 indicating that it can now transmit data. The terminal 10 will transmit the address of the remote destination as well as, other information such as code set, line lengths, special character assignments etc. and so on. The front end processor 61 interprets and decodes such information in order to formulate the proper headers for the data packets which are developed in the PAD 30.

Thus the front end processor which may include a microprocessor, is known in the art and, functions to formulate packets as well as, for formulating headers and control information.

A memory 140 has stored therein a base value of Td for each subscriber as NPT 10. This value is determined according to the speed of the receiving and sending terminal located at each NPT location. Memory 140 may be a ROM memory having stored therein a base value for each NPT 10 and 11. When a call is setup by a customer such as NPT 10, the memory is accessed via an address register 141 and the value of Td for NPT 10 is stored in a register 142. A register 43 which is part and parcel of the PAD translates the called address which is the address of the NPT terminal to which terminal 10 wishes to be connected. Also shown is a memory 44 referenced DNIC. The call address through Register 45 accesses memory 44 to provide an output from memory 44 which is indicative of the number of links and nodes that the network will have to traverse to make the required connection. The value of the base Td obtained from memory 140 and as stored in register 142 is then modified according to the value obtained from memory 44. The new value of Td or Td' is then used for the beginning of the call. This value sets a timing counter 50 and is employed as the predetermined value for the start of the call. As data is sent out in packet form the timing counter 50 is reset to the Td' value each time. This is shown in FIG. 2 by means of the new packet register 51.

In addition, a continuous character count is done on the transmitted data as indicated by register 52. The character count 52 is conventional in such system and is the same kind of counter which is employed in such system for billing and revenue purposes. As the amount of data for transmission reaches incremental threshold steps, a new value of Td' is computed thus giving Td'', Td''' and so on.

As shown in FIG. 2, coupled to the character count 52 is a threshold step logic 53. Essentially, the logic 53 counts the number of characters transmitted and the number of packets transmitted. In this manner the output of the threshold logic 53 is applied to logic circuit 48 to thereby change the value of the base Td at various incremental stages during the transmission of data. The logic 48 determines the incremental thresholds by a combination of queueing theory and nodal throughput factors. Critical precision is not required for Td increments so the need for different steps for different administration nodes is not necessary. Basically, the more data that is sent on a call, the higher the value of Td. It can be shown that Td is directly proportional to the links in a call and the speed of the sending and receiving terminals and is indirectly proportional to the type of links.

Thus equation given below is indicative of the delay where:

$$Td = \frac{f(L) + f(N) + k(S)}{K(T)}$$

where f(L) is the function of the length of the call, f(n) is the function of the number of links, K(S) is a constant determined by the speed of a sending and receiving terminal and K(T) is a call by call constant determined by the type of links which are fixed during a call.

In Table 1 there is shown typical threshold points for Td.

TABLE 1

TYPICAL "Td" VALUES: DETERMINATION AND THRESHOLDS

| | VALUE "A" | | | | |
|---|---|---|---|---|---|
| MSG LNT #LNKS | 0 → 100 CHAR | 100 → 500 CHAR | 501 → 1000 CHAR | 1001 → 2000 CHAR | 2001 + CHAR |
| 1 | 1 | 2 | 5 | 9 | 20 |
| 2 | 2 | 4 | 7 | 13 | 28 |
| 3 | 4 | 8 | 14 | 27 | 39 |
| 4 | 7 | 14 | 21 | 33 | 48 |
| 5 | 9 | 21 | 32 | 47 | 70 |

Value A is calculated "on the fly" during the call.

VALUE "B"

| LINK TYPE SPEED | SATTELITE LINK | CABLE LINK | COMBINATION LINK |
|---|---|---|---|
| High ↓ Low | H ↓ L | 15 | 5 | 9 |
| Low ↓ Low | L ↓ L | 8 | 3 | 6 |
| High ↓ High | H ↓ H | 6 | 2 | 4 |
| Low ↓ High | L ↓ H | 4 | 1 | 2 |

THEREFORE, Td = (A + B) × 1 second
Value B is calculated at the start of the call.

The processing of the ACS is different than the processing of the normal EOC. In a conventional packet switching network, outgoing buffers are not discarded upon receipt of the ACS signal; nor is a CQ released. In using this timing scheme data will continue to be processed until the PAD 30 is caused to release a CQ. However, all ingoing data from the packet side is discarded once the ACS is issued as the NPT considers the call to be finished.

Thus on the NPT-PAD side the end of call ACS is an instant end of call. However, on the PAD-packet side the end of call does not illicit a CQ until Td has expired.

Referring to FIG. 2, when the subscriber as NPT 10 hangs-up or issues a disconnect command this is detected and stored in the EOC register or flip flop 54. The output of 54 is applied to one input of the AND gate 55. The other input of gate 55 is obtained from the time counter 50. Thus when the time stored in counter 50 expires, gate 55 will provide an output which will cause the PAD 30 to release a CQ.

Thus as one can see from the above described conditions, the PAD 30 cannot release a CQ until the counter 50 times out and only when the NPT has terminated the call. Since the above described ACS can employ substantial resources each customer associated with NPT terminals could be allowed to select on a call by call basis whether or not the ACS feature is to be used. The determination is made by the customer at the end of the call for factors such as the presence of different speed terminals and/or network delay may not be determined until the call has been set-up.

Thus as seen in FIG. 2, the timer 50 can be restarted for each and every data packet sent out until call termination. In this manner the output of register 51 can be used to reset the timing counter 50 (dashed line) to zero each time a new packet of data is sent. Thus the system operates on a normal basis. However, when the NPT terminal 10 terminates the call, a decision can now be made as to whether to use ACS or not. If ACS is not used, upon register 54 receiving the end of call, gate 55 is immediately activated based on the fact that the OR Gate 63 is high due to gate 62 not detecting an ACS. However, if ACS is desired, the subscriber indicates this. This condition is detected by the ACS gate 62 which forces the OR gate 54 low. The counter 50 has stored therein the last incremental value of Td. This value is the smallest time delay allowable to assure all data will reach the destination terminal. Hence when timer 50 goes to all zeros, gate 55 will provide the ACS output which will cause the PAD 20 to provide the CQ as in a conventional system.

In any event, in practical applications a second timer is required for proper ACS operation. This timer provides a safety valve to prevent PAD overload. As indicated, the timer as 50 starts and then is allowed to expire only after the last bit of buffered data is sent out on the packet side of PAD 30. If the window closes or the link goes down or some other situation arises, that prevents the complete transmission of data from taking place, a permanent loop or wait period could occur.

Figure 3:
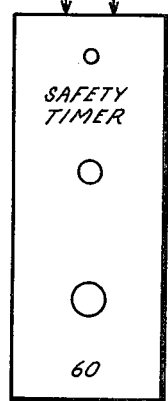
FIG. 3 is a simple block diagram of a safety timer employed in this invention.

Therefore referring to FIG. 3, a safety timer 60 (ST) is used. This timer 60 is started when ACS is received by the PAD. The timer 60 runs until it expires or resets when the PAD issues a CQ which is a clear request. The value of the time programmed into the safety timer is system wide and is a function of the type of system and the supervisory timers in the system such as timeout for registers and so on. If timer 60 expires before timer 50, a CQ with a clearing cause of network congestion as defined by CCITT (designated as SCQ) is released and any remaining buffered data is discarded. Thus in this situation when timer 60 times out before timer 50, data is discarded. In all other cases timer 50 will timeout before 60 and the data is sent out to the network prior to the CQ packet transmission.

The ACS or auto clear technique described above gives a further advantage to the packet switching system employing the apparatus. When an NPT sends a clear signal (EOC or ACS) the NPT considers the call done and terminates. However, as explained, if the call continues to be maintained at the packet side of the PAD for the period of time programmed in timer 50 due to an ACS request, it is quite likely that the NPT will issue a new call before the final CQ. Thus this new call is only a single call on the NPT-PAD side but would cause multiple calls on the PAD-packet side.

The number of multiple calls is directly proportional to the time stored in timer 50 and available system resources. The longer the Td, the more multicalls will take place. Thus as long as the NPT-PAD link is idle and system resources available a call can be established regardless of any call in progress on the PAD-packet side. This results in the NPT looking to the network as a packet terminal supporting many logical channels.

The purpose of the ACS is to allow data that normally would be lost in a virtual call due to buffering and/or congestion to be delivered by delaying the release of the clear request packet. The combination of the ACS along with the multicall feature provides a connection for non-packet terminal cases with the theoretical efficiency of a packet terminal interface. The use of ACS provides a substantially improved message transmission integrity for use with a packet switched data communication system.

We claim:

1. In a packet-switched data communications system for providing bidirectional communication between a plurality of originating and destination data terminals, said terminals capable of being selectively connected together through a switching network associated with said system, with said originating terminals connected to a packet assembly and disassembly apparatus(PAD) for receiving data from said plurality of terminals and arranging said data into a high speed packet data stream for transmission of said stream to a destination PAD associated with said destination terminals, with said destination PAD operative to retrieve data packets from said stream indicative of data transmitted from any one of said originating terminals and to direct said data to a selected one of said destination terminals, the combination therewith of apparatus for providing a connection release when said originating terminal terminates said connection, comprising:

means responsive to said originating terminal providing a connection release to provide a signal indicative of said release, timing means responsive to said signal to provide a predetermined delay manifesting a time period sufficient to assure the transmission of data from said originating to said destination terminal, and means responsive to said predetermined delay having elapsed to provide a clear request signal to said packet switched data communications system, whereby said connection will be released by said system only after the elapse of said predetermined time period.

2. The combination of apparatus according to claim 1 further comprising:

safety timing means responsive to said signal for fixed time period, said safety timing means responsive to the generation of said predetermined time to provide a clear request signal if said predetermined time has not elapsed.

3. The combination of apparatus according to claim 1 wherein said timing means includes means coupled thereto for presetting said timing means with a particular reference value manifesting a characteristic of any one of said originating terminals, whereby said predetermined delay is implemented according to the characteristic of any one of said originating terminals.

4. The combination of apparatus according to claim 3 further comprising:

memory means having a plurality of addressable storage locations for storing at each location data indicative of each type of originating terminal, whereby each terminal is associated with one of said locations for storing thereat data indicative of a predetermined time delay associated with that terminal.

5. The combination of apparatus according to claim 4 further comprising:

logic means coupled to said memory means and operative to modify said stored data according to the length of a data message to be transmitted by any one of said originating terminals.

6. The combination of apparatus according to claim 5 wherein said logic means further includes means for modifying said stored data according to the connection path made between an originating and destination terminal.

7. The combination of apparatus according to claim 6 wherein said logic means further includes means responsive to the speed of operation characteristic of said originating terminal to modify said predetermined time accordingly.

8. A method of providing a call release in a packet-switched data communications system, of the type having a plurality of originating terminals and a plurality of destination terminals, with a switching network for connecting an originating terminal with a destination terminal, comprising the steps of:

providing a first signal when one of said originating terminals desires to terminate a connection, providing a selectable time period according to said desire to terminate a connection, delaying said signal for said selectable time period, transmitting a clear request to said network after said selectable time period has expired.

9. The method according to claim 8 wherein the step of providing said selectable time period includes:

computing said time period according to the length of the message transmitted between said originating and destination terminal.

10. The method according to claim 8 wherein the step of providing said selectable time period includes:

computing said time period according to the type df transmission links between said originating and destination terminal in said connection.

11. The method according to claim 10 wherein the step of providing said selectable time period includes:

computing said time period according to the transmission speed of said originating and destination terminals.

12. The method according to claim 11 wherein the step of providing said selectable time period includes:

providing a first fixed time period for each of said originating terminals, varying said first fixed time period as data is transmitted to providing new time periods, and transmitting a clear request to said system when said last new time period elapses.

13. The method according to claim 8 further comprising the step of:

providing a fixed time period commencing operation when said selectable time period is provided, and transmitting a clear request when said fixed time period elapses before said selectable time period.

14. The method according to claim 12 including the step of storing in memory said first fixed time period for each of said originating terminals.

* * * * *